Figure 1:
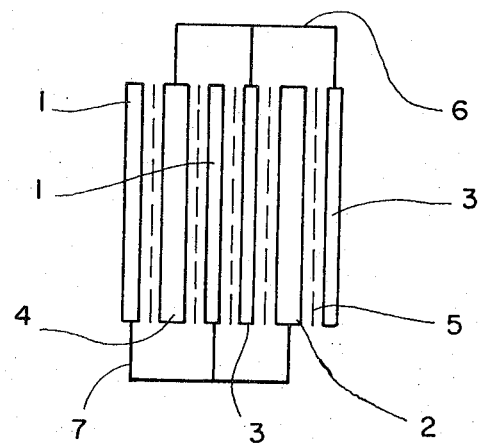

United States Patent [19]
Dickfeldt

[11] 3,852,110
[45] Dec. 3, 1974

[54] GASTIGHT ALKALINE BATTERY WITH PASTE AND SINTERED ELECTRODE

[75] Inventor: Siegfried Dickfeldt, Hagen, Germany

[73] Assignee: Varta Batterie Aktiengesellschaft, Hannover, Germany

[22] Filed: Oct. 11, 1973

[21] Appl. No.: 405,291

[52] U.S. Cl. ............... 136/6 R, 136/9, 136/20, 136/68
[51] Int. Cl. ................................ H01m 35/00
[58] Field of Search ......... 136/9, 68, 19, 35, 66–67, 136/75, 13, 20, 21, 24, 26, 27, 28–31, 120 R, 3, 6 R, 6 A

[56] References Cited
UNITED STATES PATENTS
291,850   1/1884   Knowles .................................. 136/9
1,918,044  7/1933   Kyle ....................................... 136/81

FOREIGN PATENTS OR APPLICATIONS
1,596,089  2/1971   Germany ............................. 136/24

Primary Examiner—Anthony Skapars
Attorney, Agent, or Firm—Gerard J. Weiser; Alfred Stapler; Karl L. Spivak

[57] ABSTRACT

In a gastight alkaline battery, the positive and negative plate groups are both composed of paste and sintered electrodes.

6 Claims, 9 Drawing Figures

PATENTED DEC 3 1974 3,852,110

SHEET 1 OF 3

GASTIGHT ALKALINE BATTERY WITH PASTE AND SINTERED ELECTRODE

This invention relates to alkaline batteries and cells.

Most gastight alkaline battery cells are provided either with sintered electrodes or with paste electrodes, that is to say the active negative and positive materials are present in a sintered nickel body, or in perforated, nickel-plated, sheet-iron pockets, or in a nickel gauze sheath.

In German Auslegeschrift No. 1596,089, there is disclosed a gastight, sealed nickel/cadmium battery comprising a positive sintered electrode and a pressed or rolled negative electrode in which the active material is pressed directly upon the conducting grid.

Gastight alkaline paste cells, for example in the known form of button cells, are simple and cheap to manufacture. Protection against overcharging as well as protection against polarity reversal may be ensured by inserting a so-called "antipolar mass" into the positive electrode. Cells of this type can be formed while in sealed condition, with simultaneous development of negative discharge reserve, resulting from the low charging factor of the negative electrode as compared with that of the positive electrode. By "negative discharge reserve" is meant the amount of current which can still be drawn from the negative electrode after complete discharge (reduction) of the positive electrode, before the negative electrode is also completely discharged (oxidized). The negative discharge reserve prevents the negative electrode from limiting the capacity of the cell upon application of higher loads, or in the course of numerous discharges.

On the other hand, gastight alkaline paste cells have the disadvantage of exhibiting increased internal resistance, their performance at high currents and low temperatures being thus inferior to that of cells of the same kind provided with sintered electrodes.

Gastight alkaline sintered cells have the advantage of possessing high load capacity, even at low temperatures, good voltage level and good capacity. However, they have the disadvantage that they are not protected, or protected only to a limited extent, against polarity reversal, since it is not always possible for an adequate amount of "antipolar mass" to be accommodated in the sintered skeleton in addition to the active positive material. When cells of this kind are, like paste cells, formed while in sealed condition, a negative discharge reserve fails to develop or does so only to a small extent, since the charging factors of the negative and positive electrodes are only slightly different from each other.

However, an adequate negative discharge reserve is particularly required in gastight sintered cells, in order to prevent the negative electrode from limiting the capacity of the cell upon high current discharges or after numerous discharges. Cells of this type thus require more complicated forming, while in open condition, in order to ensure the development of a negative discharge reserve.

It is an object of the invention to avoid or reduce one or more of the aforementioned disadvantages of gastight alkaline batteries which comprise paste electrodes or sintered electrodes.

In accordance with the invention, this and other objects which will appear are achieved by providing both the positive and the negative plate groups with both paste and sintered electrodes.

In accordance with the invention, the negative and the positive plate groups in a gastight alkaline battery cell both comprise a combination of sintered and paste electrodes, the sintered electrodes ensuring good performance at high currents and low temperatures, and the paste electrodes allowing forming while in the sealed condition and development of the requisite negative discharge reserve, while at the same time ensuring protection of the gastight cell against polarity reversal.

It has been found that particular advantages with respect to high-current performance are afforded by an electrode arrangement, in which a negative or positive paste electrode, respectively, functions in opposition to two sintered electrodes of the respectively opposite polarity positioned on opposite sides, and in which the positive and negative sintered electrodes positioned between a positive and a negative paste plate function in opposition to each other.

Figure 2:
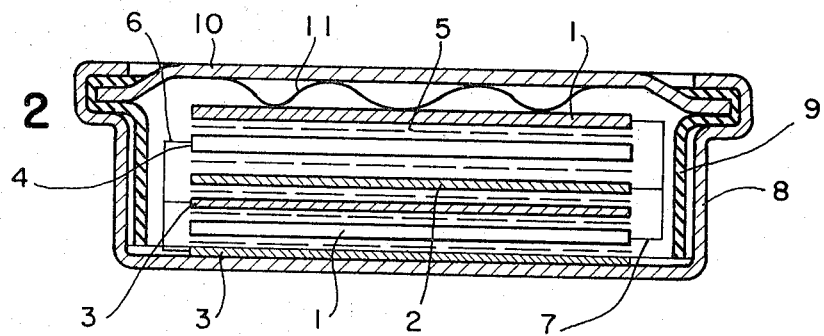
Figure 3:
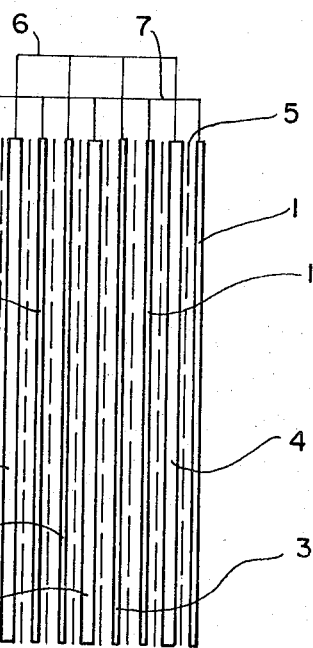
Figure 4A:
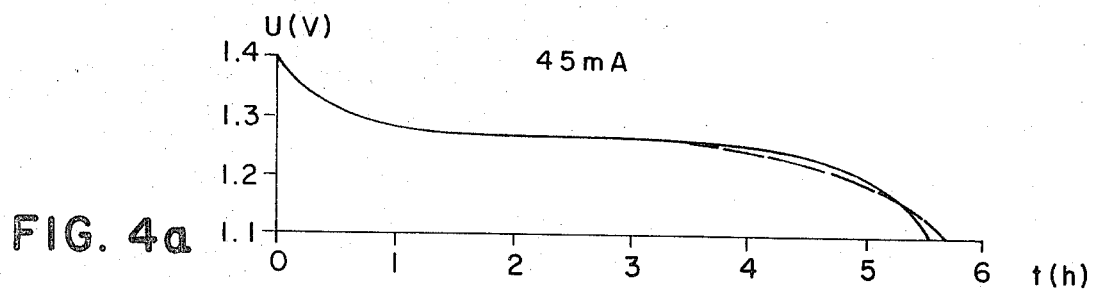
Figure 4B:
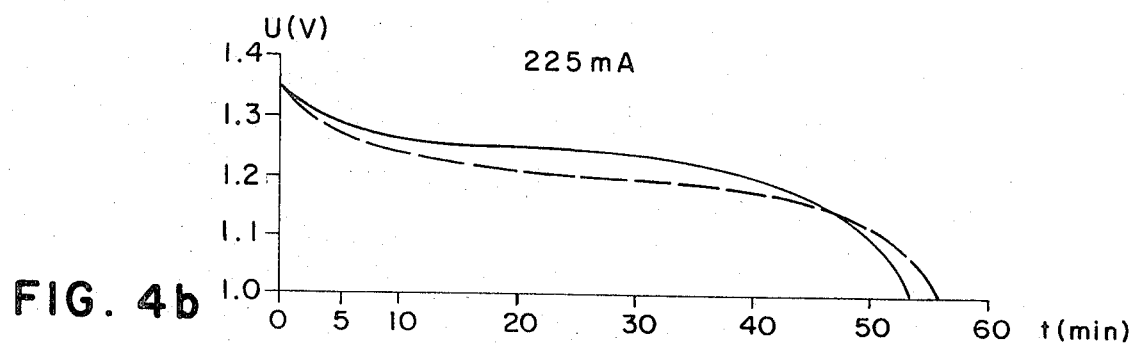
Figure 4C:
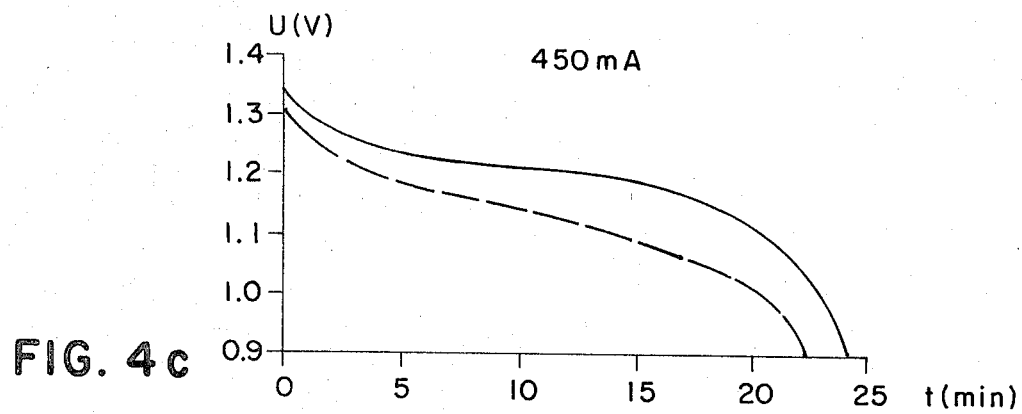
Figure 4D:
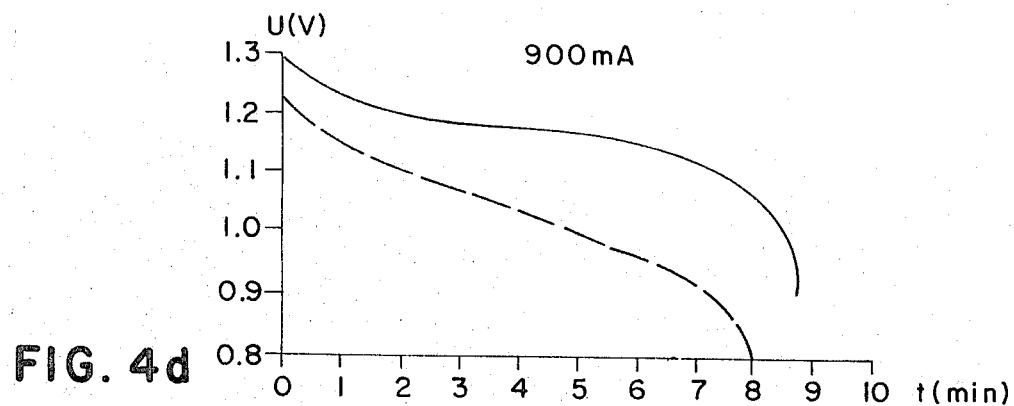
Figure 5A:
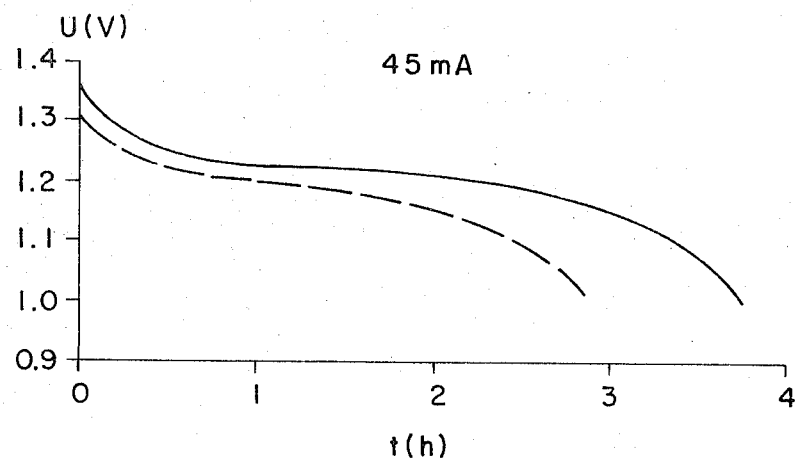
Figure 5B:
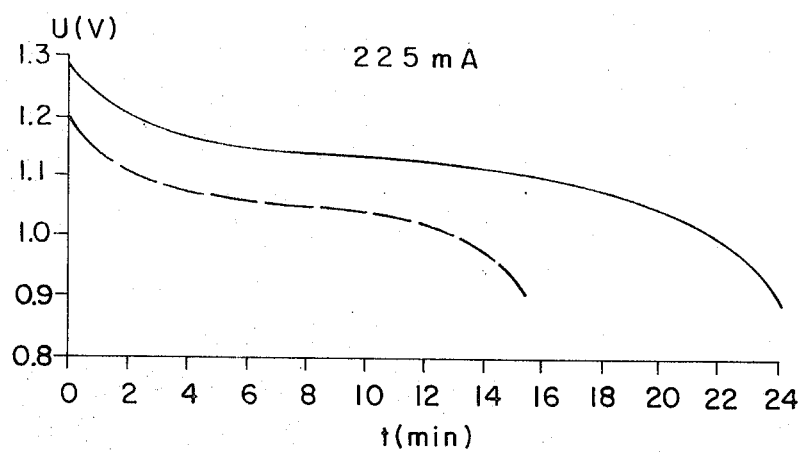

The invention is hereinafter described by way of example with reference to the accompanying drawings, wherein FIGS. 1 to 3 are diagramatic illustrations of embodiments of the invention; and FIGS. 4a to 4d, 5a and 5b show comparative operating characteristics for embodiments of the invention as compared with those of the prior art.

The same reference numerals are used to designate similar elements in the different figures.

In FIG. 1 there is shown a diagram of a plate group according to the invention. Negative sintered electrodes 1 are connected to the negative paste electrode 2 by a connector 7, the positive sintered electrodes 3 being similarly connected to the positive past electrode 4 by a connector 6. The individual electrodes are insulated from each other by separators 5. The electrodes are positive and negative triple electrodes, respectively comprising two sintered electrodes and one paste electrode. As mentioned previously, the paste electrodes respectively function in opposition to two sintered electrodes of the opposite polarity. Moreover, as can be seen, sintered electrodes 1 and 3 positioned between the paste electrodes function in opposition to one another.

FIG. 2 shows the plate group illustrated in FIG. 1 in a button cell comprising a cup-shaped casing 8, a sealing and insulating ring 9, a contact spring 11 and a cover 10.

FIG. 3 shows a diagram of a plate group according to the invention which is suitable for rectangular cells. The negative sintered electrodes 1 are connected to each other and to the negative paste electrode 2 by a connector 7, the positive sintered electrodes 3 being similarly connected by a connector 6 to the positive paste electrodes 4. The individual electrodes are insulated from each other by separators 5. In this construction, too, the positive or negative paste electrode respectively functions in opposition to two sintered electrodes of opposite polarity. The interior sintered electrodes likewise function in opposition to one another.

Discharge characteristics are plotted in broken lines in FIGS. 4a to 4d for cells of conventional construction provided with nickel/cadmium twin electrodes, and discharge characteristics are plotted in solid lines for cells according to the invention. These characteristics show that the voltage level of cells according to the invention at room temperature and at discharge currents of $I=45$ mA, 225 mA, 450 mA and 900 mA is substantially superior to that of the known cells. This applies also to FIGS. 5a and 5b in which the discharge characteristic is plotted at −20°C. and at discharge currents of 45 mA and 225 mA, respectively.

In FIGS. 1, 2 and 3, the positive paste electrodes comprise the conventional additive of antipolar mass in order to ensure protection against polarity reversal in a gastight cell. As usual in gastight alkaline cells, the capacity of the negative electrodes exceeds that of the positive electrodes. This may be conveniently compensated by corresponding proportioning of the negative paste electrode.

I claim:

1. A gastight alkaline battery, comprising positive and negative paste groups each of which comprises both paste and sintered electrodes.

2. A battery according to claim 1, in which each positive or negative paste electrode is positioned between two sintered electrodes of respectively opposite polarity.

3. A battery according to claim 2, in which between positive and negative paste electrodes there are positioned at least one positive and one negative sintered electrode.

4. A battery according to claim 3, in which said sintered electrodes positioned between paste electrodes alternate in polarity with respect to each other and with respect to said paste electrodes.

5. A battery according to claim 1, in which each positive paste electrode comprises in addition an antipolar mass.

6. A plate structure for gastight alkaline batteries comprising positive and negative plate groups, each group comprising at least one paste electrode and at least one sintered electrode.

* * * * *